(12) United States Patent
Peterman et al.

(10) Patent No.: US 11,767,575 B2
(45) Date of Patent: Sep. 26, 2023

(54) VORTEX SCRAP METAL INJECTOR

(71) Applicant: GPRE IP, LLC, St. Louis, MO (US)

(72) Inventors: John M. Peterman, Troy, MO (US); Mark A. Roberts, St. Charles, MO (US)

(73) Assignee: GPRE IP, LLC, St. Louis, MO (US)

( * ) Notice: Subject to any disclaimer, the term of this patent is extended or adjusted under 35 U.S.C. 154(b) by 241 days.

(21) Appl. No.: 17/371,263

(22) Filed: Jul. 9, 2021

(65) Prior Publication Data

US 2022/0010406 A1 Jan. 13, 2022

Related U.S. Application Data

(60) Provisional application No. 63/049,746, filed on Jul. 9, 2020.

(51) Int. Cl.
*C22B 9/02* (2006.01)
*C22B 9/16* (2006.01)

(52) U.S. Cl.
CPC . *C22B 9/02* (2013.01); *C22B 9/16* (2013.01)

(58) Field of Classification Search
CPC  C22B 9/16; C22B 9/02; C22B 21/066; C22B 21/0092; F27B 3/10; F27D 3/00

USPC .......................... 266/204, 209, 210, 233, 901
See application file for complete search history.

(56) References Cited

U.S. PATENT DOCUMENTS

| 3,997,336 | A | * | 12/1976 | van Linden | C22B 21/0092 266/901 |
| 4,147,531 | A | * | 4/1979 | Miller | C22B 21/0007 75/687 |
| 5,441,556 | A | * | 8/1995 | Lewis | C22B 21/0092 266/156 |
| 6,074,455 | A | * | 6/2000 | van Linden | F27B 3/18 266/900 |
| 11,471,938 | B2 | * | 10/2022 | Fontana | B22D 41/00 |

* cited by examiner

*Primary Examiner* — Jessee R Roe
*Assistant Examiner* — Michael Aboagye
(74) *Attorney, Agent, or Firm* — Douglas D. Churovich, Esq.; Churovich Law, LLC

(57) ABSTRACT

A vortex injection system for a metal recycling furnace a delacquering chamber and a melt chamber, and a molten metal flow channel running through each chamber. The system diverts a portion of the molten metal flow through a vortex bowl, after which that portion of the molten metal flow is then returned to the main molten metal flow. The vortex bowl has an insertion port through which scrap metal and other materials may be controllably injected into the molten metal flow.

10 Claims, 7 Drawing Sheets

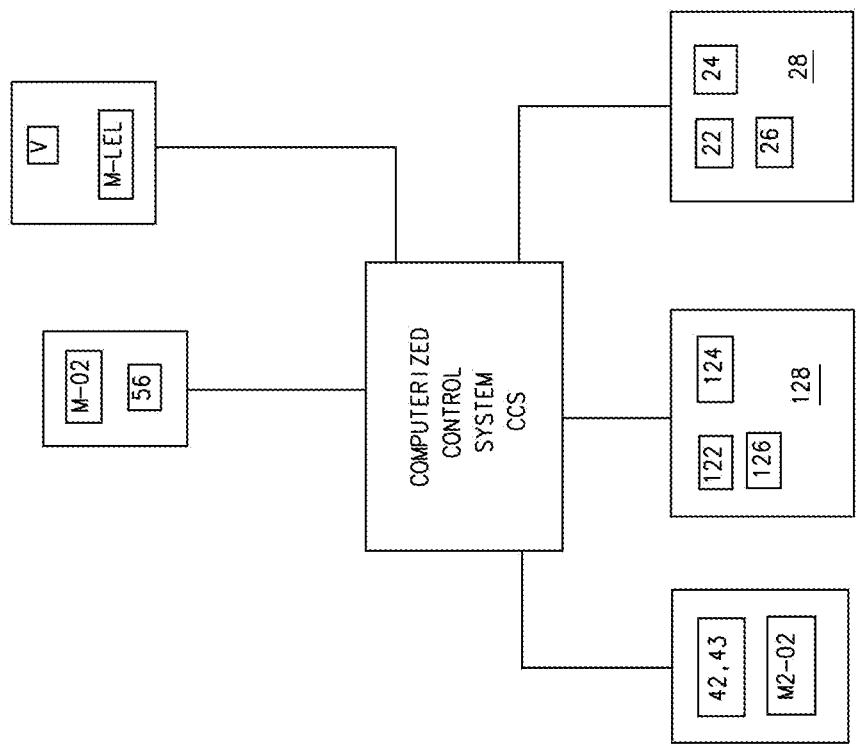

US 11,767,575 B2

VORTEX SCRAP METAL INJECTOR

CROSS REFERENCE TO RELATED APPLICATIONS

This application derives and claims priority from U.S. provisional application 63/049,746 filed 9 Jul. 2020, which application is incorporated herein by reference.

STATEMENT REGARDING FEDERALLY SPONSORED RESEARCH OR DEVELOPMENT

Not applicable.

BACKGROUND OF THE INVENTION

This invention relates principally to a system for controllably adding scrap metal in situ into a metal recycling furnace or kiln, and more particularly to a ported vortex system for the controllable in situ injection of scrap metal into the recirculating melt flow of a coated scrap metal melting furnace to control various operational conditions in the furnace.

It has for some time been a standard practice to recycle scrap metals, and in particular scrap aluminum. Various furnace and kiln systems exist that are designed to recycle and recover aluminum from various sources of scrap, such as used beverage cans ("UBC"), siding, windows and door frames, etc. One of the first steps in these processes is to use a rotary kiln to remove the paints, oils, and other surface materials (i.e., volatile organic compounds or "VOC's") on the coated scrap aluminum (i.e. "feed material"). This is commonly known in the industry as "delacquering." Delacquering is typically performed in an atmosphere with reduced Oxygen levels and with temperatures in excess of 900 degrees Fahrenheit. However, the temperature range at which the paints and oils and other surface materials are released from the aluminum scrap in the form of unburned volatile gases typically ranges between 450 and 600 degrees Fahrenheit, which is generally known as the "volatilization point" or "VOL." The delaquering chamber may be run as hot as 900 degrees Fahrenheit to ensure that sufficient heat is transferred throughout the scrap load to achieve an internal temperature of at least 450 degrees Fahrenheit.

In various such metal recycling systems, the furnace comprises multiple compartments or chambers to accommodate serial steps in the recycle process. For example, for aluminum scrap that is coated with paints and various other surface materials, it is typical to remove such coatings from the scrap aluminum before the aluminum is actually melted. Thus, in a simplistic model, such an aluminum recycle system will require at least two chambers—one for delacquering and one for actual melt purposes. In at least one version of such a furnace, after delacquering the scrap metal becomes part of a melt flow that circulates between the delacquering and melt chambers. This allows new scrap metal to be placed in the melt flow and melted, while previously melted scrap can be siphoned off from the same recirculating flow.

Unfortunately, it has been found that controlling the temperature and thermal dynamics of such a recirculating flow of molten metal can be very difficult, and that sporadic or periodic dumps of scrap metal from the delacquering chamber into the recirculating melt flow can cause undesirable fluctuations in the thermal conditions of the melt flow that can adversely impact the overall efficiency and operation of the furnace. While various types of heaters, burners and blowers can be positioned at locations along the path of the recirculation melt flow to minimize these problems, the addition of such components can be expensive and complicates the furnace and its control system. One possible solution to this problem is to add un-melted scrap metal into the molten metal stream or flow, which introduces a volume of material at a considerably lower temperature than the molten metal. However, this approach can only work if the un-melted scrap metal can be added into the molten metal flow in a regulated manner such that the furnace operator or operating system can use such injections of un-melted scrap metal as a process control operation.

It would therefore be desirable to have an apparatus or system for a scrap metal delacquering and melt furnace that provides for the controllable in situ injection of additional metals into the furnace's melt flow to improve the efficiency of and control over the system. As will become evident in this disclosure, the present invention provides such benefits over the existing art.

BRIEF DESCRIPTION OF THE DRAWINGS

The illustrative embodiments of the present invention are shown in the following drawings which form a part of the specification:

FIG. 7 is a schematic computer system flow chart of the computer control system for the furnace of the present disclosure in association with various system control loops.

Corresponding reference characters indicate corresponding parts throughout the several views of the drawings.

DETAILED DESCRIPTION

Figure 1:
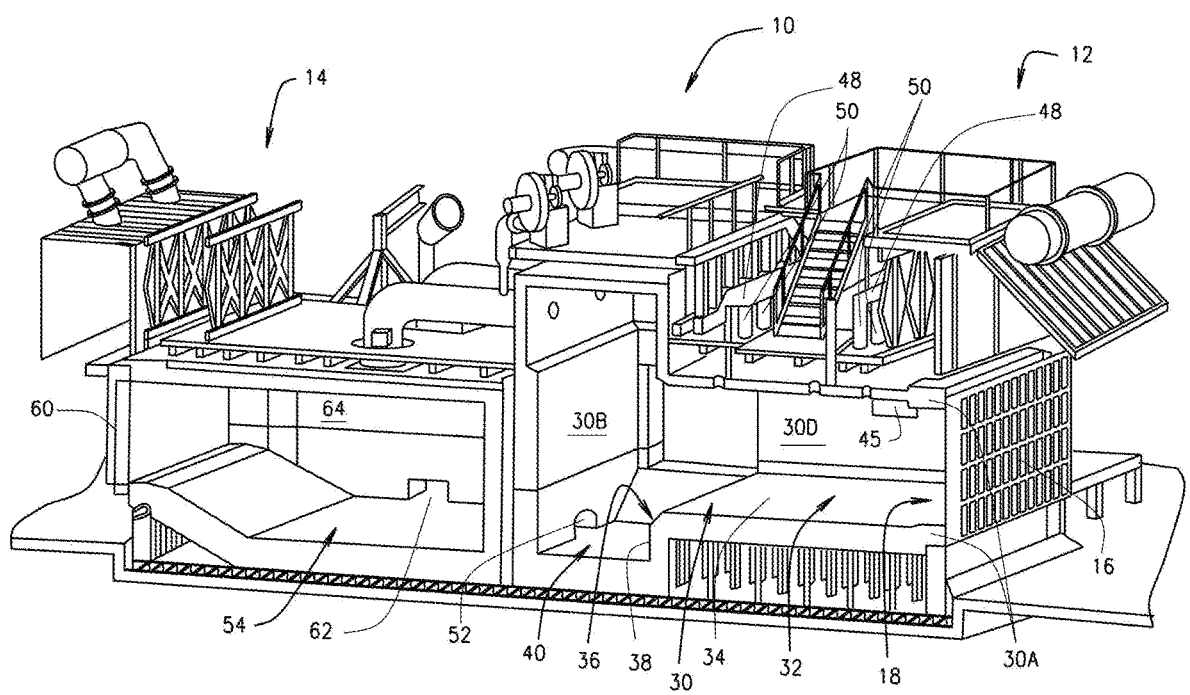
FIG. 1 is a perspective cross-sectional view of a scrap aluminum melt furnace with a delacquering chamber incorporating one embodiment of the present invention.
Figure 2:
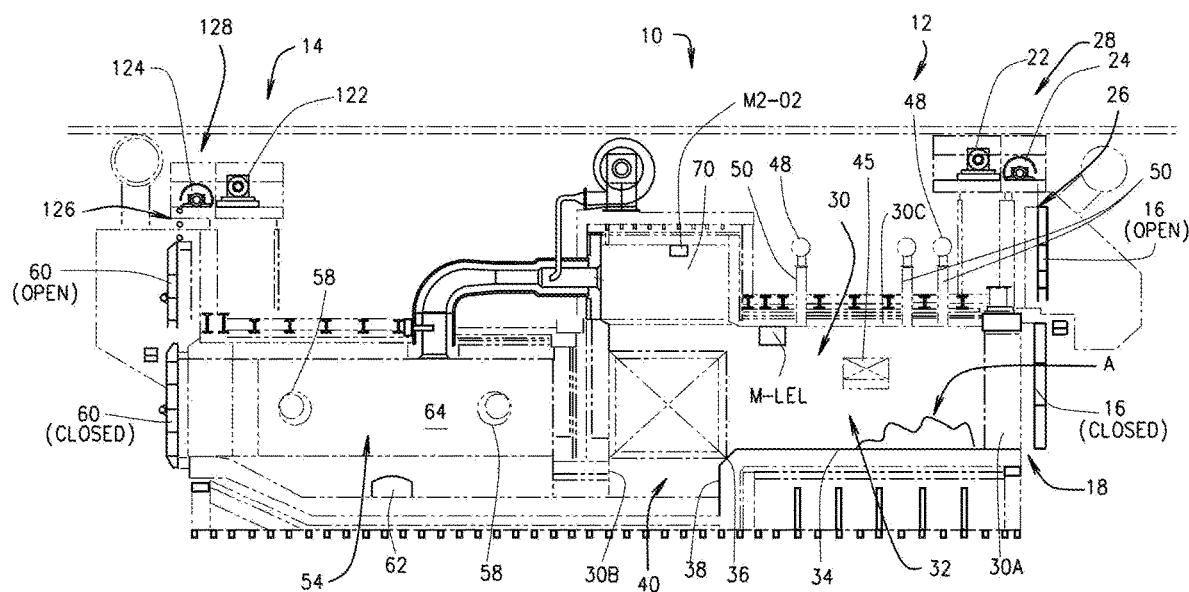
FIG. 2 is a partially diagrammatic cross-sectional plan view of the scrap aluminum melt furnace of FIG. 1.

In referring to the drawings, a schematic embodiment of a representative scrap aluminum delacquering and melt furnace 10 is shown generally in FIGS. 1-4, where the novel vortex scrap metal injector system 200 of the present invention is depicted by way of example as integrated into the furnace 10. As can be seen, the furnace 10 has a front end 12 and a back end 14 opposite the front end 12. A vertical, rectangular steel gate or door 16 is positioned, when closed, against a doorway 18 in the front end 12 of the furnace 10. The door 16 is approximately twenty-two feet wide and ten feet tall, and one foot thick. An electric lift motor 22 and associated lift gears 24, are positioned above the door 16 atop the front end of the furnace 10. A set of heavy chains 26 attach at one end to the door 16 and attach at the other end to the lift gears 24. The motor 22, lift gears 24 and chains 26 collectively form an opening system 28 for the door 16. A computer control system CCS for the furnace 10 operatively communicates with the opening system 28 to controllably raise and lower the door 16 between its closed position (as depicted in FIG. 1 and denoted in FIG. 2 as "CLOSED"), in which the door 16 rests against and seals the doorway 18, and its open position in which the door 16 fully exposes the doorway 18 (as depicted and denoted in FIG. 2 as "OPEN").

The doorway 18 opens into a large, generally rectangular delacquering or coated scrap chamber 30 constructed of steel and various refractory materials. The delacquering chamber 30 has a vertical front wall 30A having dimensions of approximately 9 foot high by 24 foot wide, a vertical rear wall 30B opposite the front wall 30A having dimensions of approximately 16 foot high by 24 foot wide, a horizontal ceiling 30C having dimensions of approximately 31 foot deep by 24 foot wide, a first vertical sidewall 30D having dimensions of approximately 9 foot high by 31 foot wide, and a second vertical sidewall 30E opposite the sidewall 30D likewise having dimensions of approximately 9 foot high by 31 foot wide. The front wall 30A includes the doorway 18 and the gate 16.

The delacquering chamber 30 further has a delacquering zone 32 that is approximately twenty feet wide by ten feet tall, and extends approximately twenty feet into the chamber 30 from the doorway 18. The delacquering zone 32 has a relatively flat floor 34 that extends at a slight incline downward from the doorway 18 to a one-foot wide beveled lip 36 that crosses the far end of the floor 34 opposite the doorway 18. Scrap aluminum A is loaded through the doorway 18 onto the floor 34 for initial processing in the chamber 30. The lip 36 slopes downward from the floor 34 at an angle of approximately 45 degrees to a vertical wall 38 that forms the front end of a depressed, generally rectangular pool, known as a "creek bed" 40, at the end of the delacquering chamber 30. The creek bed 40 is approximately two feet deep, twenty feet long and ten feet wide. The creek bed 40 terminates at the vertical rear wall 30B.

Figure 3:
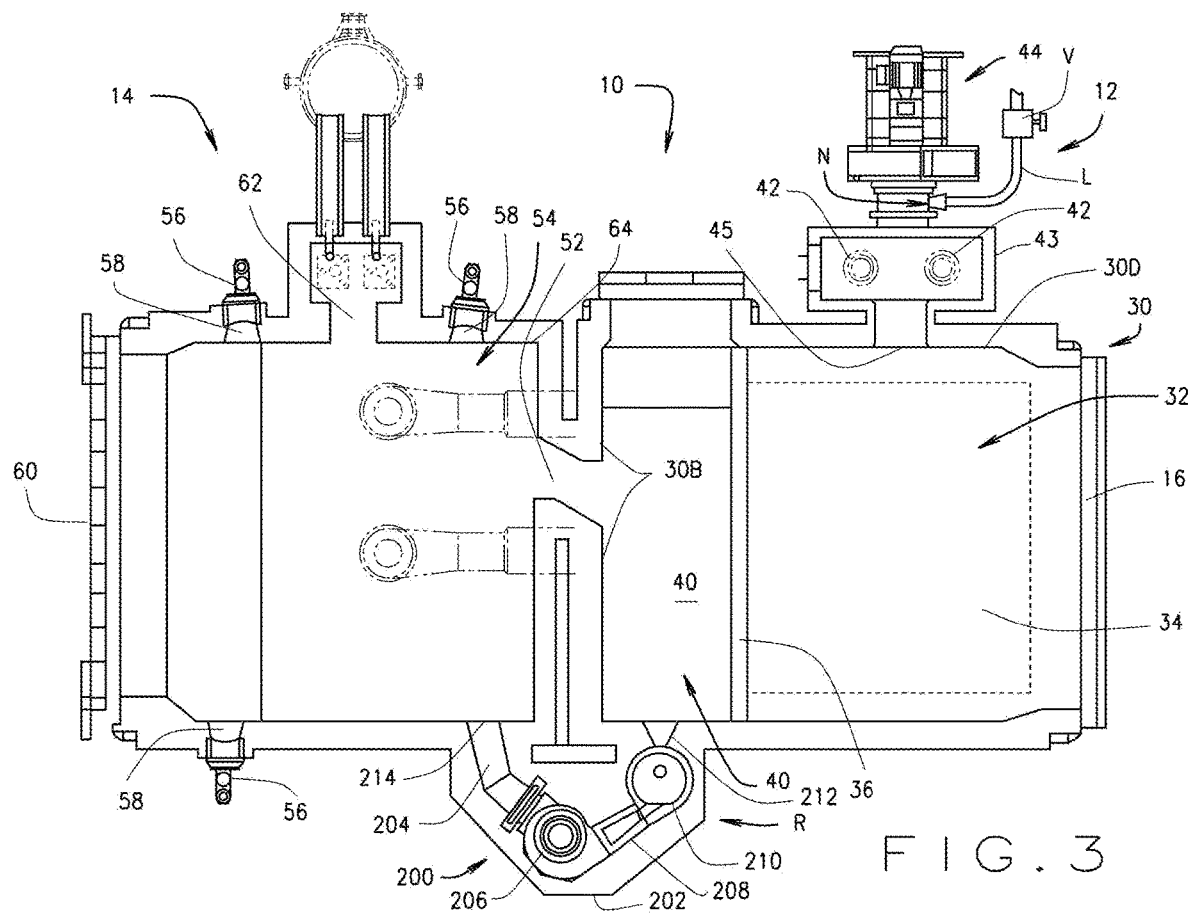
FIG. 3 is a top view of the scrap aluminum melt furnace of FIG. 1.
Figure 4:
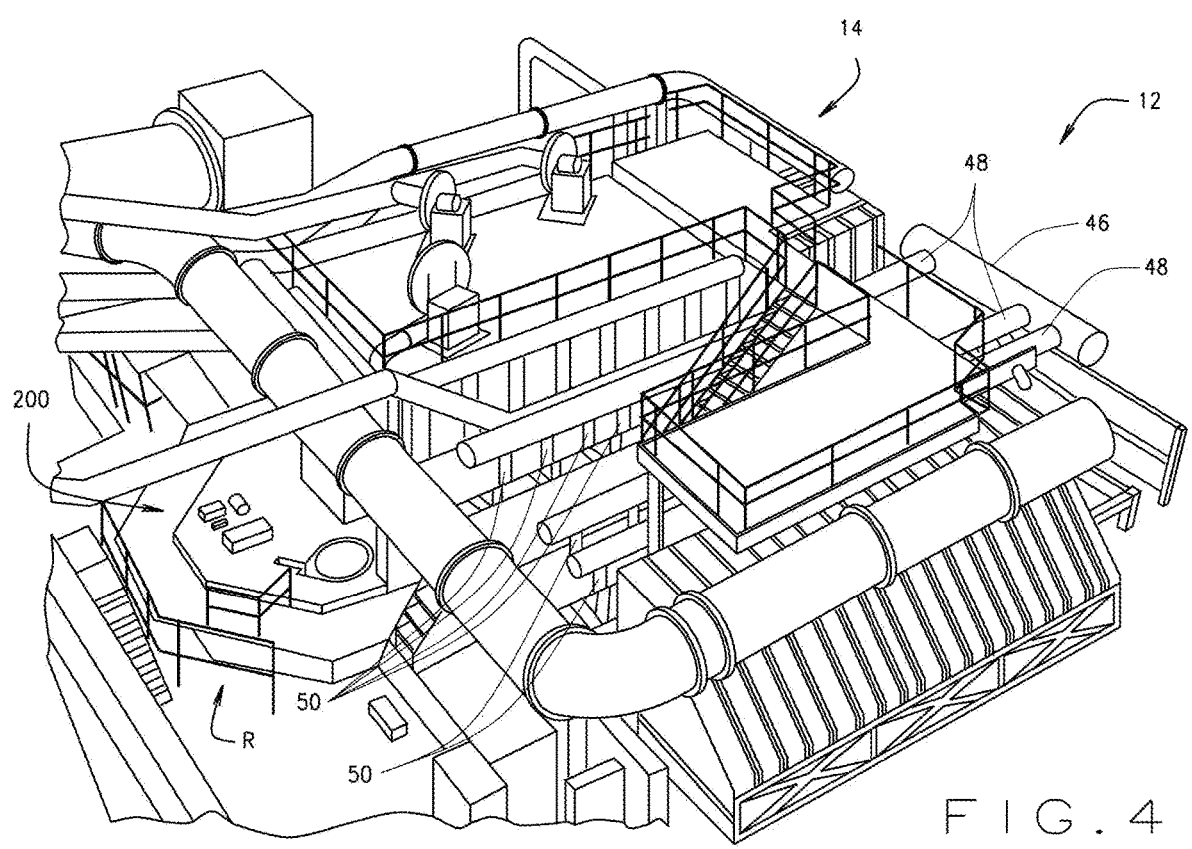
FIG. 4 is an alternate top front perspective view of the front end of the scrap aluminum melt furnace of FIG. 1.

Referring to FIGS. 3 and 4, it can be seen that a set of gas burners 42, associated with a hot gas generator 43, and a recirculation burner fan 44, are positioned outside the delacquering chamber 30 adjacent the vertical sidewall 30D. The gas burners 42 are positioned on top of, and extend partially into, the hot gas generator 43, such that the heat generated by the gas burners 42 is directed downward into the hot gas generator 43. The recirculation fan 44 draws gases from the delacquering chamber 30 through a square opening 45 in the middle of the sidewall 30D, and into the hot gas generator 43, where they are heated to approximately 1000 degrees Fahrenheit. These gases are heated using gaseous fuel, such as natural gas, which is supplied to the burners 42, to ignite and burn the gaseous fuel and to simultaneously heat the gases drawn from the delacquering chamber 30 in the hot gas generator 43. The recirculation fan 44 then directs the hot exhaust gases exiting the hot gas generator 43 into a cylindrical steel duct manifold 46 positioned above the burners 42 and horizontally next to the top of the furnace 10 above the delacquering chamber 30 (see FIG. 4). The manifold 46 directs the hot exhaust gases from the burners 42 into three smaller cylindrical steel ducts 48 that extend in a parallel fashion over the top of the delacquering chamber 30 above the floor 34. A series of even smaller cylindrical steel ducts 50 extend from each of the ducts 48 downward into and through the top of the delacquering chamber 30, such that the hot exhaust gases are directed downward into the chamber 30 and onto the scrap aluminum A positioned on the floor 34 of the chamber 30.

As can be seen from FIG. 3, a diagonal channel 52 running through the wall 30B connects the creek bed 40 to a second chamber 54 behind the wall 30B. This second chamber 54, having dimensions of approximately twenty feet wide and twenty feet long, is known as the "melt chamber" or "heating chamber" where the scrap aluminum A is fully melted and forms a pool of molten metal. A set of various gas fueled burners 56 direct heated exhaust gases through their associated cylindrical refractory ducts 58 into the heating chamber 54 to melt the aluminum in the chamber 54. The burners 56 help elevate the temperature in the heating chamber 54 to over 2,000 degrees Fahrenheit.

A rear gate 60 provides access to the heating chamber 54 for various activities, such as for example repairs, maintenance, upgrades, and cleaning. An electric lift motor 122 and associated lift gears 124, are positioned above the rear door 60 atop the rear end 14 of the furnace 10. A set of heavy chains 126 attach at one end to the top of the door 60 and attach at the other end to the lift gears 124. The motor 122, lift gears 124 and chains 126 collectively form an opening system 128 for the door 60. The computer control system for the furnace 10 operatively communicates with the opening system 128 to controllably raise and lower the door 60 between its closed position (as depicted in FIG. 1 and denoted in FIG. 2 as "CLOSED"), in which the door 60 rests against and seals the rear doorway, and its open position in which the door 60 fully exposes the rear doorway (as depicted and denoted in FIG. 2 as "OPEN").

A channel 62, positioned at the bottom of a sidewall 64 of the heating chamber 54 provides a path for molten aluminum to exit the heating chamber 54 for removal from the furnace 10.

As can be appreciated, Applicants' aluminum recycling system or furnace 10 utilizes a multi-step process. First, bulk loads or bails of coated aluminum scrap A are fed into the furnace's coated scrap hearth or delacquering chamber 30 through the full-width hearth doorway 18 when the door 16 is in its raised or "OPEN" position. The burners 42 heat the hot gases to approximately 1000 Deg. F and the recirculation blower 44 forces these hot gases down upon the pile of coated scrap aluminum A positioned on the floor 34 of the delacquering chamber 30. These hot gases are introduced into the delacquering chamber 30 above the coated scrap aluminum A. As the scrap aluminum A moves from the doorway 18 to the creek bed 40 across the floor 34, the organics and other non-metal particulates (i.e., the "VOC's") volatilize and are drawn into the vacuum hood 70 above the creek bed 40.

After the VOC's have been removed from the scrap aluminum A in the delacquering chamber 30, the scrap aluminum drops into the creek bed 40, where it joins a flow of molten aluminum recirculating from the heating/melt chamber 54. The molten aluminum in the creek bed 40 circulates into the heating chamber 54 through the channel 52 in the rear sidewall 30B of the chamber 30. The molten aluminum is heated in the heating chamber 54 by the heat generated by various heat sources, including the burners 56. A portion of the melted aluminum in the heating chamber 54 is allowed to exit the furnace 10 through the channel 62 for removal from the system 10, while another portion of the melted aluminum is returned to the creek bed 40 by a molten metal recirculating system R (see FIG. 3).

An Oxygen monitor M-O2 (see FIG. 7; not shown in FIGS. 1-6) positioned in the exhaust flue for the heating chamber 54 continually monitors Oxygen levels evacuating the chamber 54 and communicates its readings to the computer control system CCS. The CCS adjusts and controls the air/gas ratio of the heating chamber burners 56 to ensure the burning of any residual VOC's before such VOC's exit the chamber 54.

Further, another Oxygen monitor M2-O2 positioned in the hood 70 continually monitors Oxygen levels in the hood 70 over the creek bed 40, generates an electric signal indicative of the Oxygen level in the hood 70, and communicates that electronic signal to the computer control system CCS. This 4-20 mA electric signal reflects a range of 0% to 21% Oxygen. The Oxygen level in the delacquering chamber 30 will have a predetermined "low O2" set-point between 0-6% to prevent combustion from occurring in the delaquering chamber 30. The burner fuel-mix ratios for each of the burners 42 in the hot gas generator 43 are adjusted and controlled by the computer control system CCS based upon the Oxygen level measured in the hood 70 by the monitor M2-O2, so as to maintain a desired Oxygen level within the delacquering chamber 30. Programmed limits will prevent the burners 42 from firing outside of acceptable Oxygen ratio limits.

Finally, a lower explosive limit ("LEL") monitor M-LEL, located in the delacquering chamber 30, detects the explosive level of the atmosphere within the delacquering chamber 30, and communicates that LEL level to the computer control system CCS. In the event that the LEL reading exceeds a predetermined "safe" level, the computer control system CCS recognizes an alarm state in the furnace 10 and opens an electronically controlled gas shut-off valve V connected to a Nitrogen supply line attached to the furnace 10, so as to automatically inject Nitrogen gas into the delacquering chamber 30 to reduce the LEL level and minimize the risk of explosion in the chamber 30. The Nitrogen gas is injected through an inlet gas port N proximate the recirculation blower 44. This results in generally even distribution of Nitrogen gas throughout the entire delacquering chamber 30. Of course, the Nitrogen can be injected at nearly any position in the system so long as sufficient Nitrogen reaches the chamber 30 to rapidly compensate for an excessive LEL reading. Of course, other neutral gases or neutral gas mixtures can be used in place of Nitrogen. When such an event occurs, the furnace doors 16 and 60 will both be automatically locked by the computer control system CCS during such high LEL event, and will not be allowed to open until the LEL reading has been reduced to a safe level.

Figure 5:
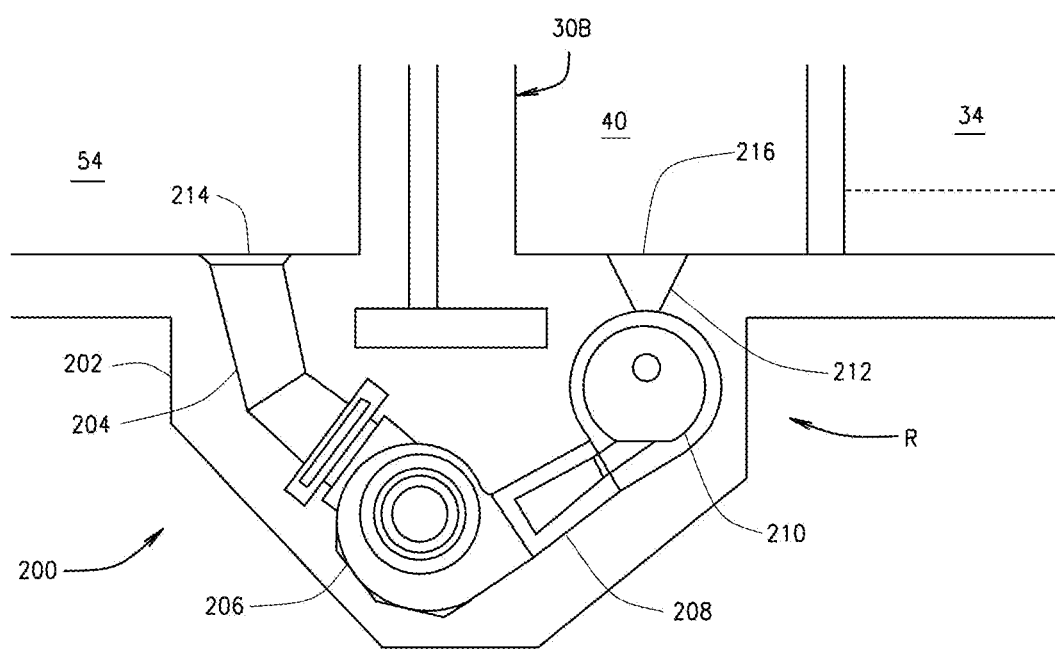
FIG. 5 is a top view of the vortex well system for the scrap aluminum melt furnace of FIGS. 1-4.
Figure 6:
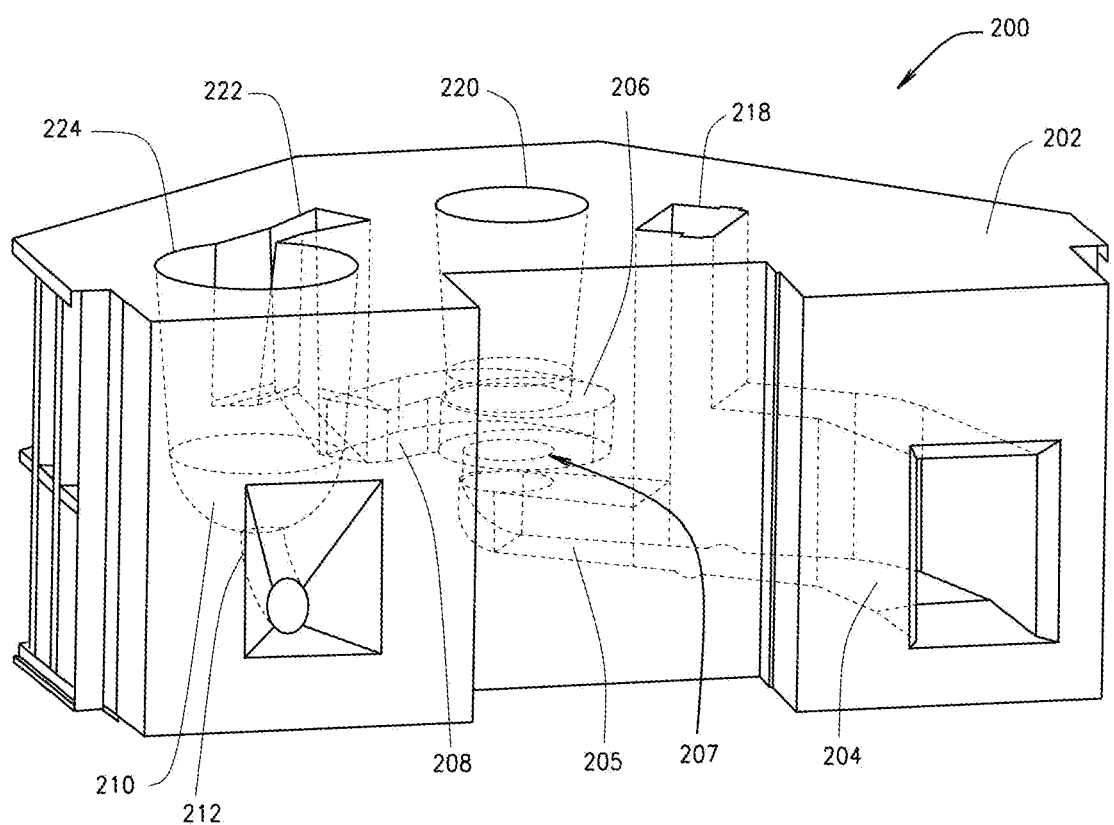
FIG. 6 is a skeletal perspective view of the vortex well system of FIG. 5.

Referring again to FIG. 3, and more particularly to FIGS. 5 and 6, the vortex scrap metal injector system 200 for the furnace 10, incorporated in the metal flow recirculating system R, has a generally triangular shaped sheet metal casing 202 that houses a first molten metal flow conduit 204, a pump supply conduit 205, a molten metal wheel or vein pump 206, a pump motor (not shown) that drives the pump 206, a second molten metal flow conduit 208, a vortex bowl 210, and a third molten metal flow conduit 212 exiting from the vortex bowl 210. Access openings 218, 220, 222 and 224 are located along the top of the casing 202 that provide access to the first conduit 204, the pump 206, the end of the second conduit 208 opening into the vortex bowl 210, and vortex bowl 210, respectively, for maintenance and operation of the vortex system 200. The opening 218 also provides access to a "rock screen" (not shown) positioned in the body of the first conduit 204. The rock screen is a ceramic filter that prevents large objects, such as for example chunks of un-melted steel, from being pulled into and possibly damaging the pump 206.

Referring to FIG. 5, the first molten metal flow conduit 204 is connected and open to a first port or window 214 in the side of the melt or heating chamber 54. The port 214 is positioned below the upper surface of the molten metal bath contained in the heating chamber 54. Similarly, the third molten metal flow conduit 212 is connected and open to a second port or window 216 in the side of the creek bed 40 in the delacquering chamber 30. The port 216 is positioned below the upper surface of the molten metal bath contained in and flowing across the creek bed 40.

Referring again to FIG. 6, the pump 206 has rotary veins (not shown) that rotate about a vertical central axis in a direction to draw molten scrap metal upward from the first conduit 204 through the pump 206, into and through the second conduit 208, and into the side of the vortex bowl 210. Opposite the port 214, and after curving below the access opening 218, the lower portion of the first conduit 204 opens into a pump supply conduit 205. Pump supply conduit 205 is generally rectangular in cross-sectional shape, has approximately one-third the cross-sectional area as the first conduit 204, and extends horizontally from the first conduit 204 just below the access opening 218 to the underside of the pump 206, where molten metal flows into the pump 206 through a pump inlet 207. It can also be seen that the entire pump 206 is positioned below the top of the first conduit 204. Because the pump supply conduit 205 and the pump inlet 207 are both positioned entirely below the horizontal midline of the first conduit 204, the flow of molten metal into the pump inlet 207 from the pump supply conduit 205 will only be disturbed by a substantial reduction of molten metal in the first conduit 204. That is, the orientation of the pump supply conduit 205 and the pump inlet 207, both positioned below the top of the first conduit 204, ensure that the pump supply conduit 205 will remain full of molten metal and the pump 206 will not run dry unless the molten metal level drops below the top of the pump supply conduit 207.

It can therefore be appreciated that in this manner the pump 206 draws a predetermined portion of the molten scrap metal contained in the heating chamber 54, determined by the dimensions of the pump supply conduit 205, into and through the vortex injector system 200 from the port 214. Thus, the amount of molten metal supplied to the pump 206 can be controlled by changing the dimensions of the pump supply conduit 205, or by inserting a controllable valve or gate (not shown) in the pump supply conduit 205. The pump 206 rotates at a variable high speed of approximately 300-500 rpm. The speed of the pump 206 controllably varies depending on various process conditions, such as for example, the temperature of the metal in the vortex system 200 and the depth of the molten metal flow.

The high rate of molten metal flow generated by the pump 206 creates a very high velocity stream of molten metal exiting the pump 206 that is forced horizontally through the second conduit 208 and at an acute angel into the side of vortex bowl 210 to create a high speed flow that circulates the inner surface of the vortex bowl 210. The molten metal forced into the vortex bowl 210 swirls about the curved or cupped inner surface of the vortex bowl 210 and then exits downward through a discharge outlet 226 in the bottom of the bowl 210 that opens into the third conduit 212. In addition to providing access to the vortex system 200 for maintenance, the conjoined openings 222 and 224 also act as an injection or insertion port to provide a location for operators to controllably place quantities of metal and other materials into the molten metal flow circulating in the furnace 10.

Items and materials such as metal scrap placed in the molten metal flow in the vortex bowl 210 will be rapidly submerged in the vortex flow in the vortex bowl 210, and quickly assimilated into the molten metal in the bowl to become part of the molten metal flow recirculated from the system 200 into the creek bed 40. Without the vortex bowl 210, metals and other materials added to the molten metal flow would simply float atop the molten metal for extended periods of time or drop to the bottom of the flow, blocking and clogging the metal flow. Hence, the vortex system 200 minimizes the potential for clogging in the molten metal flow and accelerates the assimilation of newly added scrap metal and materials in the molten metal flow. Further, the high speed of the molten metal flow out of the vortex system 200 also aids in circulating the mix of melted and as yet un-melted metals in the creek bed 40 into the heating chamber 54.

As can be appreciated, the vortex system 200 also provides a convenient means to control various aspects of the furnace 10 operation. For example, the flow rate of the molten metal can be decreased by adding more un-melted metal in the vortex bowl 210 to cool the stream exiting the vortex system 200. Of course, reducing the amount of un-melted metal added to the vortex bowl 210 will have the opposite effect, and allow the molten metal flow exiting the vortex system 200 to remain at a more elevated temperature and thereby flow faster. These variations in the temperature and flow rate of the molten metal entering the creek bed 40 can also be used to control various aspects of the internal operation of the furnace 10. That is, by controllably adjusting the temperature of the molten metal through the vortex system 200, the amount of heat carried by the recirculating molten metal flow into the creek bed 40 and into the melt chamber 54 can also be impacted.

Moreover, the vortex system 200 provides a ready means for the introduction of specific metals and other materials into the molten metal flow to enable the operators to create alloys in the furnace 10. For example, if the scrap metal placed in the furnace 10 constitutes a known composition of a particular metal, such as a particular grade of Aluminum, the furnace operators can inject desired or predetermined quantities of differing metals and/or other materials into the vortex system 200 such that those materials will be mixed with and rapidly assimilated into the molten metal flow to create a desired molten alloy.

While we have described a configuration that may be encompassed within the disclosed embodiments of this invention, numerous other alternative configurations, that would now be apparent to one of ordinary skill in the art, may be designed and constructed within the bounds of our invention as set forth in the claims. Moreover, the above-described vortex metal injection system 200 for a metal recycle furnace 10 of the present invention can constructed and arranged in a number of other and related varieties of configurations without expanding beyond the scope of our invention as set forth in the claims.

For example, the vortex system 200 may include more than one pump 206 or vortex bowl 210. The pump 206 can be positioned in the furnace 10, or there may be no need for a pump 206, so long as the molten metal flow has sufficient pressure to reach the vortex bowl 210. There may be fewer or more access openings to the components of the vortex system 200, other than the openings 218, 220, 222 and 224. The vortex system can be positioned at some other location on the furnace 10, or even partially or full inside the furnace 10. The size and shape of the vortex bowl 210 is not limited to that shown in the Figures, but may comprise a variety of shapes and sizes, so long as the vortex bowl 210 performs the functions as outlined hereinabove.

By way of further example, the vortex system 200 may be connected to the furnace 10 computer control system CCS to control the pump 206, or may alternatively include an independent computer controller. Further, the vortex system 200 may include a variety of sensors and associated controllers to detect, monitor and regulate the process operation of the system 200, either under the control of the furnace's CCS or an independent computer controller.

In addition, the vortex system 200 can be adapted to adjust the height of the molten metal flow in the vortex bowl 210 relative the height of the molten metal flow in the furnace 10, so as to provide additional operator control over the flow of molten metal through the vortex system 200 and the furnace 10. This can be accomplished in a variety of ways. For example, the vortex bowl 210 can be positioned on a lift system to raise or lower the entire bowl, and such a lift system can be associated with a computer control loop that adjusts the height of the vortex bowl 210 based upon one or more operational conditions such as for example the temperature of the molten metal flow in the vortex system 200 or the molten metal flow rate in the vortex system 200. As another example, the end of the second conduit 208 entering the vortex bowl 210 can be configured to move up and down to create a higher or lower directional flow of molten metal in the vortex bowl 210.

Additional variations or modifications to the configuration of the above-described novel vortex injector system 200 for a metal recycle furnace 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

What is claimed is:

1. A vortex injection system for a metal recycling furnace, said furnace having a delacquering chamber and a melt chamber separated from said delacquering chamber, said furnace having a flow channel for a first flow of molten metal there through, a first section of said flow channel being exposed to said delacquering chamber, a second section of said flow channel being exposed to said melt chamber, said vortex injection system comprising:
   a. a vortex bowl adapted to receive a second flow of molten metal, said second flow comprising at least a portion of said first flow, said vortex bowl creating a vortex in said second flow;
   b. a first port for the flowing of molten metal into said vortex bowl, said first port receiving said second flow at least in part from one of said first section and said second section of said flow channel;
   c. a second port for the flowing of molten metal out of said vortex bowl, said second port directing molten metal from said vortex bowl into one of said first section and said second section of said flow channel; and
   d. a lift, said lift being adapted to controllably raise and lower said vortex bowl.

2. The vortex injection system of claim 1, further comprising a temperature automatic control loop, said temperature automatic control loop comprising a computer controller and a temperature sensor, said computer controller being operatively associated with said lift and with said temperature sensor, said temperature sensor measuring the temperature of molten metal in one of said vortex injection system and said furnace, and generating an electronic signal indicative of said temperature being measured, said computer controller receiving said electronic signal and controlling said lift to adjust the height of said vortex bowl in response to said electronic signal.

3. The vortex injection system of claim 2, wherein said temperature sensor measures the temperature of molten metal in said furnace delacquering chamber.

4. The vortex injection system of claim 2, wherein said temperature sensor measures the temperature of molten metal in said furnace melt chamber.

5. The vortex injection system of claim 1, further comprising a flow rate automatic control loop, said flow rate automatic control loop comprising a computer controller and a molten metal flow rate sensor, said computer controller being operatively associated with said lift and with said molten metal flow rate sensor, said molten metal flow rate sensor measuring the flow rate of molten metal in one of said vortex injection system and said furnace and generating an electronic signal indicative of said molten metal flow rate being measured, said computer controller receiving said electronic signal and controlling said lift to adjust the height of said vortex bowl in response to said electronic signal.

6. The vortex injection system of claim 5, wherein said molten metal flow rate sensor measures the flow rate of said first flow of molten metal.

7. The vortex injection system of claim 6, wherein said molten metal flow rate sensor measures the flow rate of molten metal in said furnace delacquering chamber.

8. The vortex injection system of claim 6, wherein said molten metal flow rate sensor measures the flow rate of molten metal in said furnace melt chamber.

9. The vortex injection system of claim 5, wherein said molten metal flow rate sensor measures the flow rate of said second flow of molten metal.

10. The vortex injection system of claim 1, wherein said lift is mechanical.

\* \* \* \* \*